United States Patent
Alstad et al.

(10) Patent No.: US 10,926,885 B2
(45) Date of Patent: Feb. 23, 2021

(54) HYBRID MOTION MOUNT SYSTEM

(71) Applicant: HONEYWELL INTERNATIONAL INC., Morris Plains, NJ (US)

(72) Inventors: Shawn Alstad, Phoenix, AZ (US); Jeff Guymon, Gilbert, AZ (US); Justin C. Mickelsen, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 525 days.

(21) Appl. No.: 15/873,128

(22) Filed: Jan. 17, 2018

(65) Prior Publication Data

US 2019/0217964 A1 Jul. 18, 2019

(51) Int. Cl.
| | |
|---|---|
| *B64D 27/26* | (2006.01) |
| *F16M 13/02* | (2006.01) |
| *F16F 15/06* | (2006.01) |
| *B64D 27/20* | (2006.01) |
| *F16F 15/08* | (2006.01) |

(52) U.S. Cl.
CPC ............ *B64D 27/26* (2013.01); *B64D 27/20* (2013.01); *F16F 15/06* (2013.01); *F16F 15/085* (2013.01); *F16M 13/02* (2013.01); *B64D 2027/262* (2013.01)

(58) Field of Classification Search
CPC ......... B64D 27/26; B64D 27/20; F16F 15/06; F16F 15/085
See application file for complete search history.

(56) References Cited

U.S. PATENT DOCUMENTS

| | | | |
|---|---|---|---|
| 3,387,505 A | 6/1968 | Rumsey | |
| 4,634,081 A | 1/1987 | Chee | |
| 4,717,094 A | 1/1988 | Chee | |
| 5,421,655 A * | 6/1995 | Ide | F01D 25/164 384/99 |
| 5,927,644 A | 7/1999 | Ellis et al. | |
| 8,621,874 B2 | 1/2014 | Watson et al. | |
| 9,897,162 B2 * | 2/2018 | Witwer | F16F 15/085 |
| 2012/0018575 A1 * | 1/2012 | Whiteford | B64D 27/20 244/54 |
| 2012/0085859 A1 | 4/2012 | Barnes et al. | |
| 2013/0134257 A1 * | 5/2013 | Barber | B64D 27/26 244/54 |
| 2015/0192188 A1 * | 7/2015 | Witwer | F16F 15/085 248/562 |
| 2016/0122029 A1 * | 5/2016 | Serra | B64D 27/26 244/54 |

FOREIGN PATENT DOCUMENTS

WO 2007047976 A1 4/2007

* cited by examiner

*Primary Examiner* — Justin M Benedik
(74) *Attorney, Agent, or Firm* — Lorenz & Kopf, LLP

(57) ABSTRACT

A mount system provides vibration isolation and support through a hybrid hard-soft configuration. The mount system includes a frame and a body connected with the frame. A first coupling element is provided on the body and defines a first opening. A second coupling element is provided on the frame and defines a second opening. A pin extends through the first and second openings to couple the body to the frame. At least one of the first and/or second openings operates as a damping hole with a series of slits disposed about the damping hole, so that the damping hole with the slits is configured to deflect to reduce the transmission of vibrations between the body and the frame.

20 Claims, 11 Drawing Sheets

HYBRID MOTION MOUNT SYSTEM

TECHNICAL FIELD

The present invention generally relates to mount systems, and more particularly relates to hybrid hard/soft vibration damping mount systems that dampen through tunable motion control.

BACKGROUND

Mount systems are used in a variety of applications to physically support or connect objects relative to each other. A mount may be hard with a rigid connection between objects, or it may be soft with an elastic connection between objects. A hard, rigid connection readily transfers motion and vibrations between the connected objects. A soft connection with elasticity reduces the transfer of vibrations and is typically accomplished through the use of elastomers. Elastomers may degrade and disintegrate over time or may dissipate/be consumed when exposed to high heat conditions. Accordingly, the use of elastomers to support an object is not optimal in some applications, leading to complicated mounting systems, or to the use of rigid connections where vibration damping would otherwise be desirable.

One application where mount systems are employed involves turbomachines, such as those in turbofan, turbojet, and other turbine engines. These applications often experience forces during operation which may result in complex load transfers between operating components. For example, an aircraft can perform maneuvers during flight which create forces between the components due to their inertia. In addition, operation may generate vibrations that may transfer between components. For example, vibrations generated by the engine are preferably attenuated before reaching the airframe, where they may be sensed by occupants.

Accordingly, it is desirable to provide systems with effective component mounting and that attenuate vibrations. It is also desirable to provide an effective system in a cost-effective manner. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description section hereof. This summary is not intended to identify key or essential features of the claimed subject matter, nor is it intended to be used as an aid in determining the scope of the claimed subject matter.

In a number of embodiments, a mount system provides vibration isolation and support through a hybrid hard-soft configuration. The mount system includes a frame and a body connected with the frame. One coupling element is provided on the body and defines a first opening. Another coupling element is provided on the frame and defines a second opening. A pin extends through the first and second openings to couple the body to the frame. At least one of the first and/or second openings operates as a damping hole with a series of slits disposed about the damping hole, so that the damping hole with the slits is configured to deflect to reduce the transmission of vibrations between the body and the frame.

In other embodiments, a mount system includes a body and a connected frame. A coupling element is provided on the body with an opening defined by the coupling element. Another coupling element is provided on the frame with another opening defined by the other coupling element. A pin extends through the openings to couple the body to the frame. At least one of the openings comprises a damping hole with a series of slits disposed concentrically about the damping hole. The damping hole, with the series of disposed slits, is configured to reduce the transmission of vibrations between the body and the frame.

In additional embodiments, a mount system includes an engine connected with a frame. A coupling element is provided on the engine, and defines a damping hole and a series of first slits disposed about the damping hole. Another coupling element is provided on the frame, with another damping hole and another series of slits. A pin extends through the damping holes to couple the engine to the frame. The damping holes and the slits are configured to reduce the transmission of vibrations between the engine and the frame.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this description, an exemplary mount system includes one or more openings for connecting mating elements to couple a pair of bodies together. The openings act as damping holes with a series of slits located about the damping holes and configured to reduce the transmission of vibrations between the bodies. The mount system is described in the context of an exemplary embodiment, which in this case is within an aircraft environment where the bodies are an airframe and a connected engine. The current description is not limited to aircraft environments and features of the described mount systems have applicability is a broad range of applications where vibration damping is desired. The mount systems described herein may be used where the environment may be subjected to elevated temperature events that may degrade or dissipate elastomers. As described herein, the mount system includes a continuous metal-to-metal contact route to support one mating element with another. However, the current description is also applicable beyond applications where high heat may be encountered and is also applicable in applications using materials other than metals.

Figure 1:
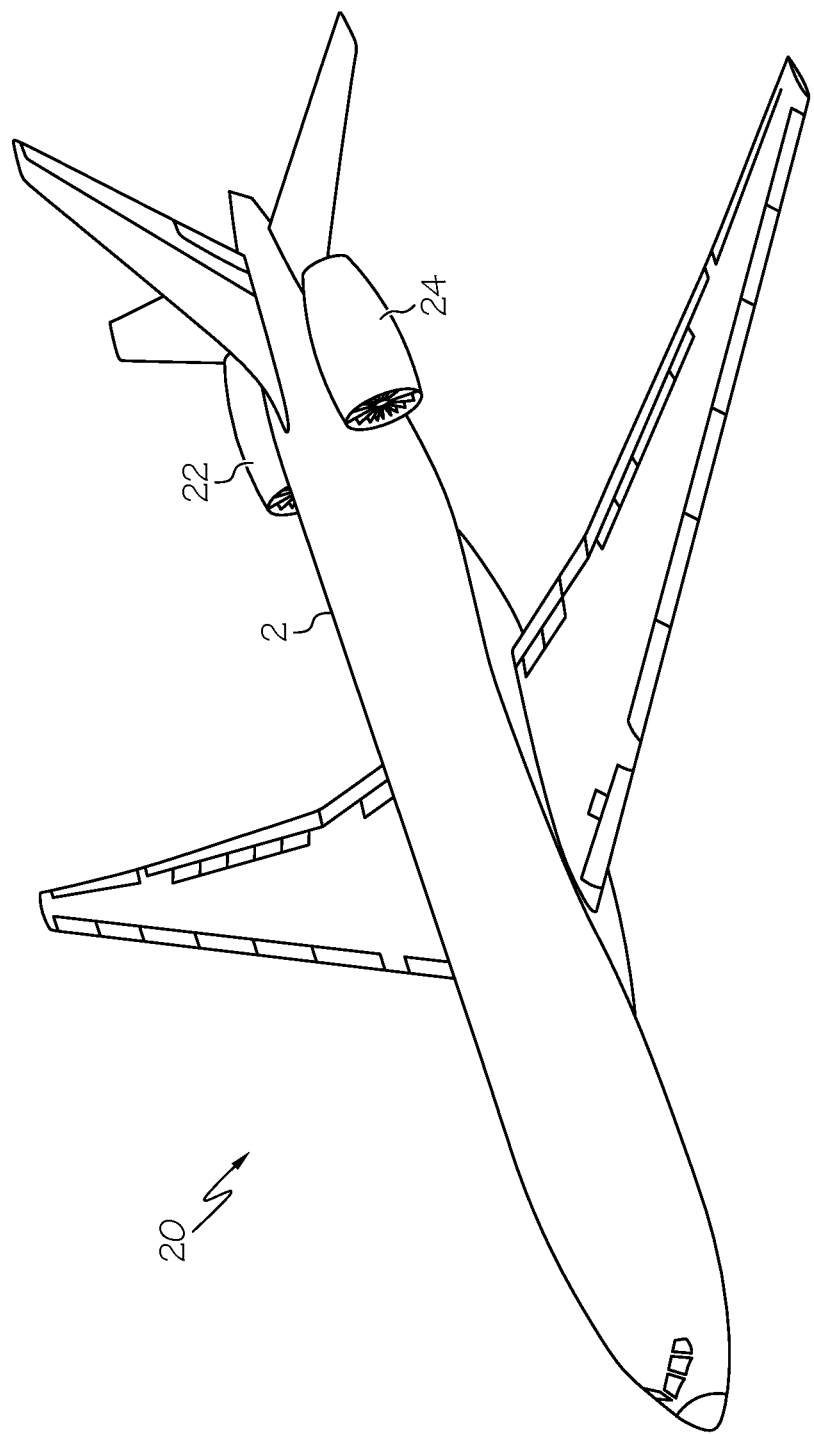
FIG. 1 is a perspective view of an aircraft with turbine engines according to an exemplary embodiment.

In an exemplary embodiment as illustrated in FIG. 1, an aircraft 20 includes a pair of turbine engines 22, 24, which are configured as turbofan engines. Although described in the context of the aircraft 20, various features and characteristics disclosed herein may be used in other contexts and applications where a mount system is used. For example, although the engines 22, 24 are used with the aircraft 20, various other engine environments, as well as different types of mounted machinery or other various connected bodies will benefit from the features described herein. Thus, no particular feature or characteristic is constrained to an aircraft or turbofan engine, and the principles are equally embodied in other vehicles, such as automobiles, or in other equipment, such as power generators or compressors, and in other applications.

Figure 2:
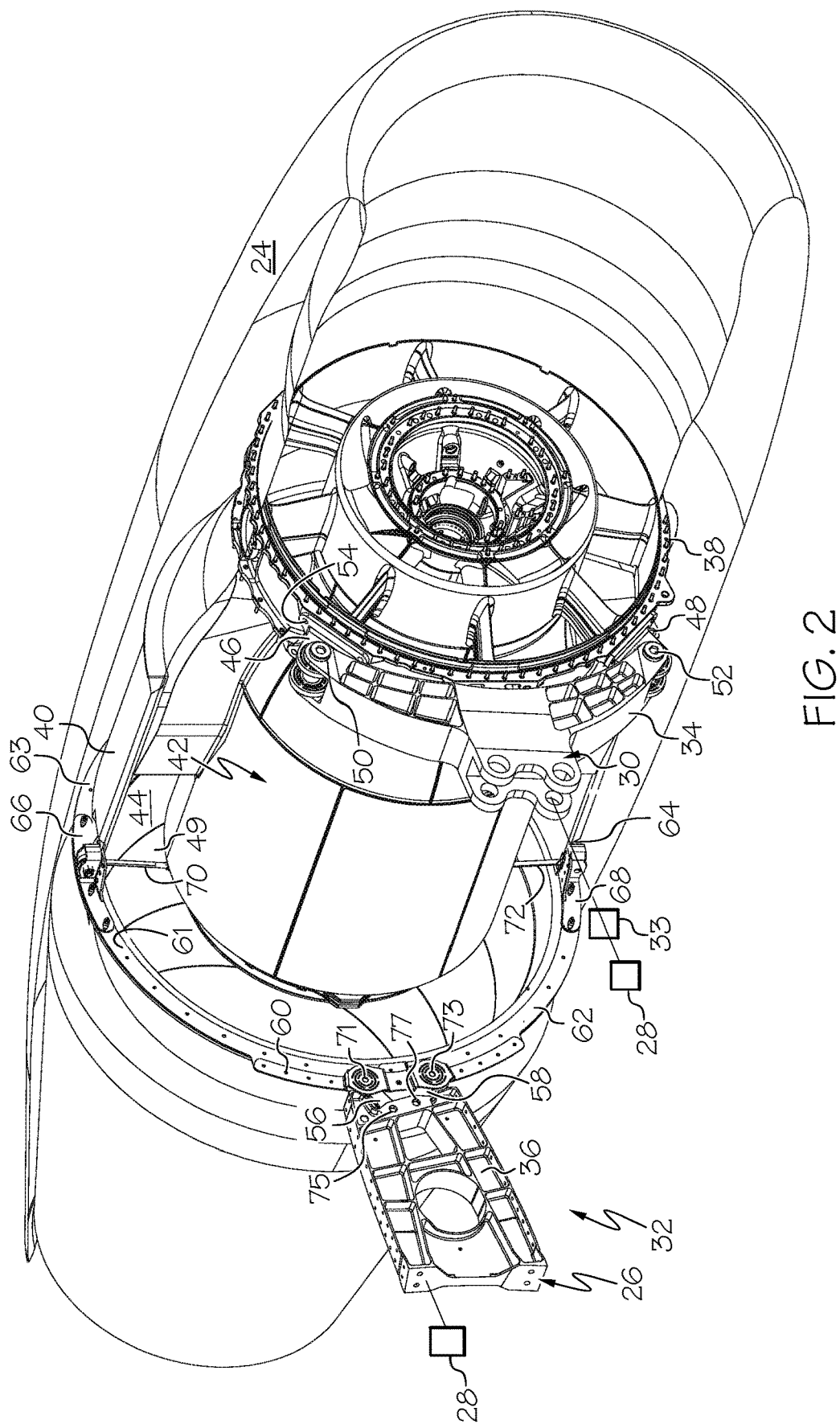
FIG. 2 is a sectioned fragmentary view of a partial engine assembly of the aircraft of FIG. 1 according to the exemplary embodiment.

In the current embodiment, the aircraft 20 is powered by the engines 22, 24, which may provide a motive force and/or may provide electrical and hydraulic power generation. Additionally, the engines 22, 24 may supply high pressure and/or high temperature air to various other components and system of the aircraft 20, if desired. As illustrated, the engines 22, 24 are coupled with the aircraft 20 on opposite sides of the fuselage. In other embodiments, other mounting positions may be used. The engines 22, 24 provide motive force alongside the aircraft 20, which is transmitted to the aircraft 20 through a mount system 26 as illustrated in FIG. 2. When operating, the engines 22, 24 may produce vibration such as from their rotating parts or due to varying operating conditions. Transfer of these vibrations into the airframe 28 may be undesirably perceived by passengers and therefore, the mount system 26 is configured to provide attenuation through damping. In the current embodiment, the airframe 28 forms the mechanical structure of the aircraft 20 and includes the fuselage.

In the exemplary embodiment as illustrated in FIG. 2, the engines 22, 24 (in this case the engine 24), includes the mount system 26 with a forward mount system 30 and an aft mount system 32, both of which are connected with the airframe 28 at structural members. In general, one or more coupling elements located on, or connected with, the engines 22, 24 are coupled with one or more coupling elements located on, or connected with, the airframe 28. The forward mount system 30 is connected with the airframe 28, such as at a pylon beam 33, through a yoke 34. The aft mount system 32 is connected with the airframe 28 at a pylon beam 36. The pylon beams 33, 36 may extend between the engines 22, 24 and may form a part of the airframe 28 of the aircraft 20. The parts of the pylon beams 33, 36 that extend between the fuselage and the engines 22, 24 are covered by an aerodynamically shaped pylon (not shown), so that the engines 22, 24 are supported at a position that is spaced away from the fuselage, in this embodiment in a cantilevered manner. The engine 24 includes the typical components that combust fuel and provide thrust. FIG. 2 omits various components from the view for simplicity, and to clearly illustrate the mount system 26 and mating components of the engine 24. As shown, the yoke 34 of the forward mount system 30 is connected with the engine 24 at a front frame 38, which is configured as a ring shaped structural member of the engine 24. The aft mount system 32 is connected with the engine 24 at an outer bypass duct 40, which along with the engine core 42 forms an annular passage 44 that contains and allows some airflow to bypass the engine core 42. The mount system 26 transfers loads between the engine 24 and the fuselage/airframe 28. These loads include those that result from the weight, thrust, aerodynamics, temperature changes, operations, and torque.

In general, the forward mount system 30 includes the pylon beam 33, the yoke 34, an upper clevis bracket 46, a lower clevis bracket 48, an upper pin 50, a lower pin 52 and the front frame 38. Fasteners 54 may be used to connect the upper and lower clevises 46, 48 with the front frame 38. The aft mount system 32 generally includes the pylon beam 36, a pair of connecting links 56, 58, a splice plate 60, load spreaders 61-64, an upper structural fitting 66, a lower structural fitting 68, connecting struts 70, 72, and pins 71, 73. In the current embodiment, the components of the forward mount system 30 and the rear mount system 32 are fabricated from metal or another heat resistant material. In this example, the components are fabricated of Inconel or titanium and provide a continuous metal load carrying structural path between the airframe 28 and the structure of the engine 24.

Figure 3:
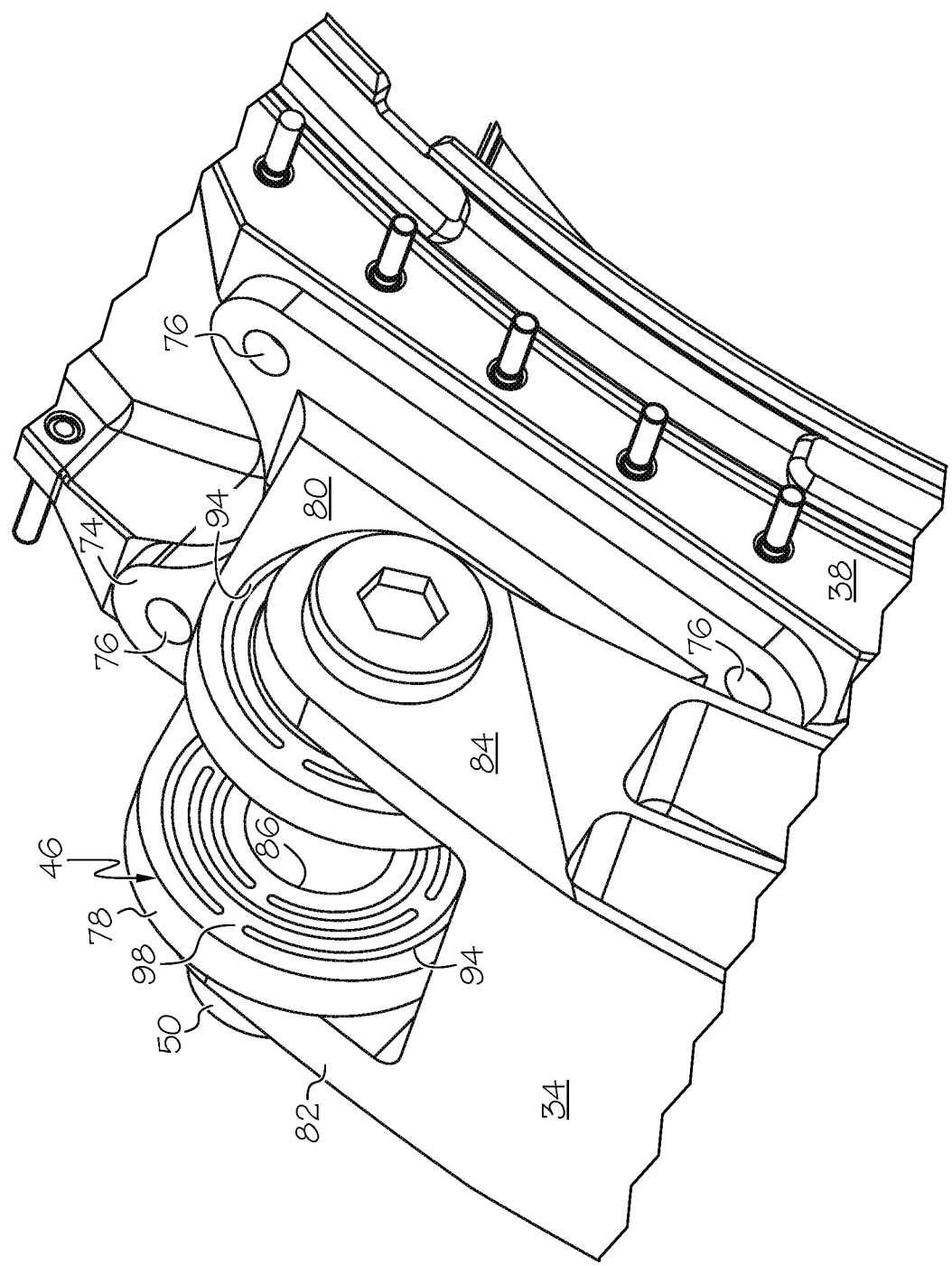
FIG. 3 is a perspective view of a forward part of the mount system of the engine of FIG. 2.
Figure 4:
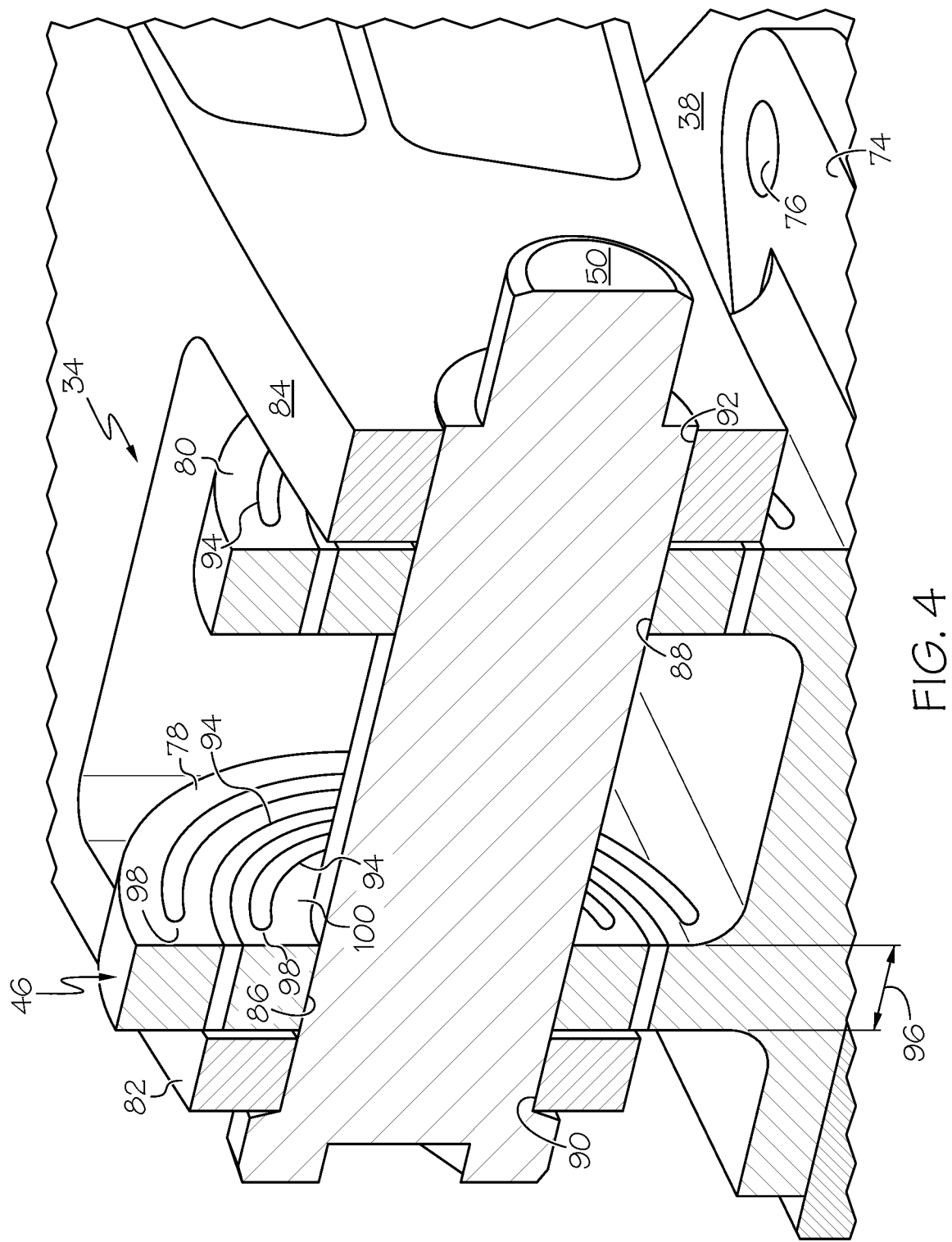
FIG. 4 is a sectioned view of part of the mount system of the engine of FIG. 2.

With reference to FIGS. 3 and 4, in the forward mount system 30, the upper clevis bracket 46 and the upper pin 50 are shown connecting the yoke 34 with the front frame 38. The upper clevis bracket 46 serves as a coupling element between the engine 24 and the airframe 28. In other embodiments, the coupling element may take other forms or may be another part of the engine 24. The upper clevis bracket 46 includes a base plate 74 with openings 76 for connecting with the front frame 38 through fasteners such as bolts (not shown). The lower clevis bracket 48 is similarly constructed. In other embodiments the upper and lower clevis brackets 46, 48 may be connected to the front frame 38 by other methods such as welding, clamping or interlocking, or may be integrally formed with the front frame 38. The upper clevis bracket 46 includes a pair of spaced apart mounting plates 78, 80 that are joined with the base plate 74 as a weldment or as an integral part thereof. The mounting plates 78, 80 are formed in the shape of D-brackets with a flat side at the base plate 74 and opposite rounded sides. The mounting plates 78, 80 are spaced apart a distance sized to mate with tangs 82, 84 on the yoke 34. The tangs 82, 84 serve as another coupling element between the engine 24 and the airframe 28. In this embodiment the tangs 82, 84 overlap the outside surfaces of the mounting plates 78, 80. In other embodiments the tangs 82, 84 may mate against the inside surfaces of the mounting plates 78, 80. The mounting plates 78, 80 include openings in the form of holes 86, 88, respectively, and the tangs 82, 84 include openings in the form of holes 90, 92 respectively. The holes 86, 88, 90 and 92 are aligned and receive the pin 50. The pin 50 extends completely through the mounting plates 78, 80 and the tangs 82, 84 and is placed in double shear for high load carrying capability. The pin 50 may be retained in place by a nut (not shown), threads or other conventional methods. The upper clevis bracket 46 and the pin 50 provide a continuous hard connection between the yoke 34 and the front frame 38, which is this embodiment is made of metal and is capable of withstanding high temperatures while maintaining a solid connection.

To provide damping between the front frame 38 of the engine 24 and the air frame 28, the connection includes a number of slits 94. The slits 94 are formed as narrow elongated openings that provide an ability to deflect for the holes 86, 88, 90 and 92 so that they act as damping holes. In the current embodiment, the slits 94 are formed in the mounting plates 78, 80, with each slit 94 shaped as an arc-like segment that may be paired with other arc-like segments to form a ring-like shape. In other embodiments the slits 94 may be formed in the tangs 82, 84 in addition to, or in place of, those in the mounting plates 78, 80. In still other embodiments, the slits may be formed at other locations of the upper clevis bracket 46 and/or the yoke 34. The slits 94 are formed in concentric ring-like shapes around the holes 86, 88 and provide a measure of deflection under load between the front frame 38 and the yoke 34 to dampen the transmission of vibrations. In operation, the slits 94 allow the location of the holes 86, 88 to move relative to their nominal location in providing the damping effect. In the current embodiment, the slits 94 include a series of concentric openings that partially encircle the holes 86, 88, and that extend completely through the thickness 96 of the mounting plates 78, 80. In other embodiments, the slits 94 may be formed in other shapes and/or may not extend completely through the thickness 96. Metal connections in the form of ligaments 98 extend radially across each of the ring-like slits 94 in the series, so that a continuous metal path of support is provided for the ring 100 that surrounds the pin 50. The ligaments 98 are staggered radially relative to one another as they pass through each of the concentric ring-like arrangements of the slits 94, so that they are not all radially aligned. The ligaments 98 may be evenly spaced to provide consistent damping in all radial directions. In other embodiments, the ligaments 98 may be wider or may be aligned or concentrated in certain radial directions to provide more support when needed to address loading. For example, as shown in FIG. 3 the ligaments 98 in the inner and outer ring-like sets are aligned providing greater load carrying capability in the aligned direction. By way of further example, in the case of three ring-like sets of slits 94, with two ligaments 98 through each of the individual ring-like sets, to provide even damping in various directions, the ligaments 94 in one ring-like set may be spaced radially sixty degrees from those in an adjacent ring-like set. Thus, the six ligaments will reside at 0, 60, 120, 180, 240 and 300 degree locations.

Figure 5:
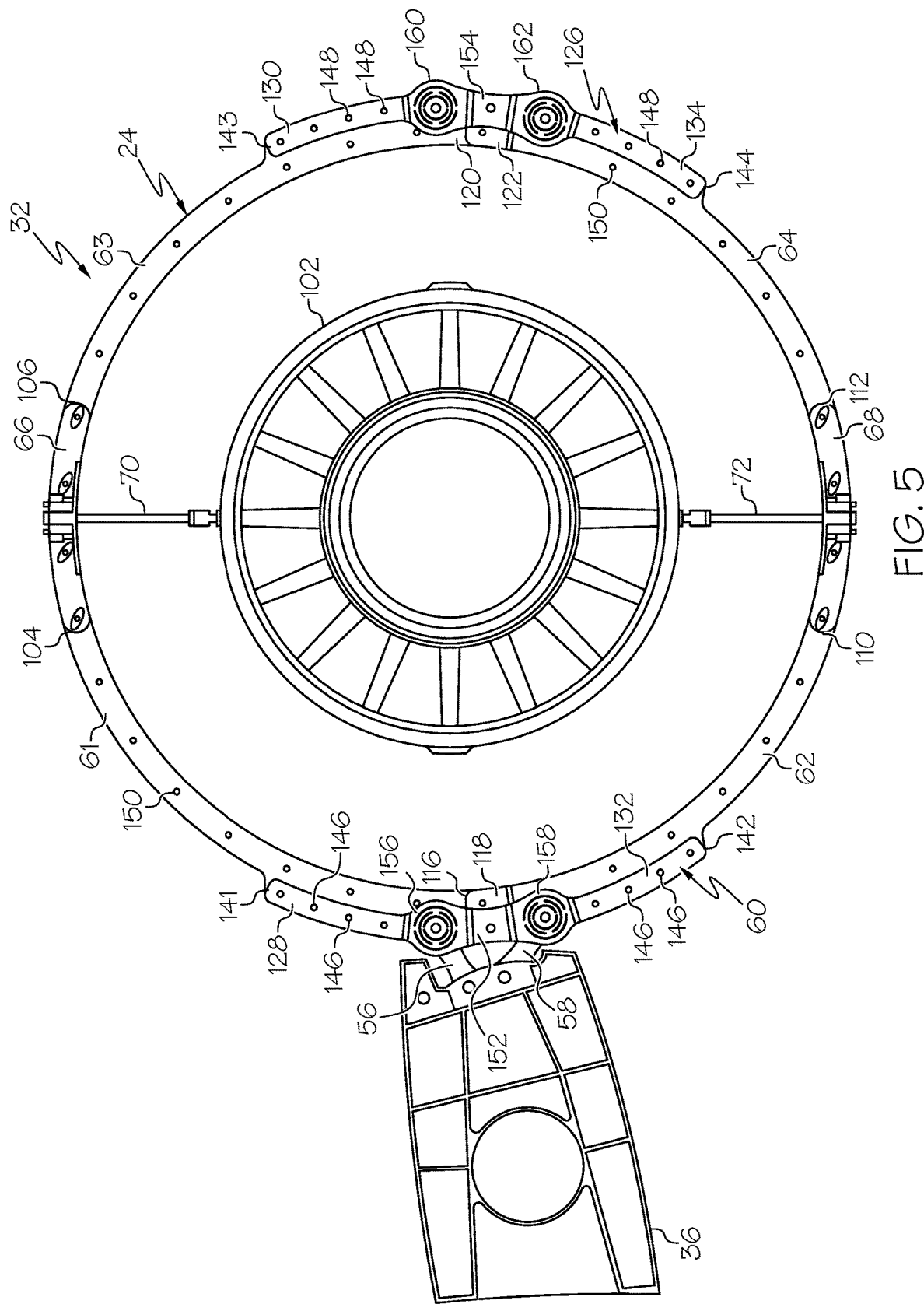
FIG. 5 is a fragmentary view of a part of the engine of FIG. 2 showing an aft part of the mount system.

Referring to FIG. 5, the components of the aft mount system 32 are illustrated with certain other components of the engine 24 being omitted for simplicity. It should be apparent that the pylon beam 36 will be connected to the airframe 28 to support the engine 24 and may be connected on either side of the aft mount system 32, depending on which side of the aircraft 20, the engine 24 is mounted. Accordingly, coupling elements are provided on both sides of the engine 24, even though only one side may be used. In other embodiments, any unused coupling element may be omitted. In the current embodiment, the connecting links 56, 58, connect between the pylon beam 36 and the engine 24. The load spreaders 61-64 surround the engine 24 and connect therewith through the outer bypass duct 40 as shown in FIG. 2, and form segments of a structural ring around the engine 24. The upper load spreaders 61 and 63 are identical, as are the lower load spreaders 62 and 64, to reduce the number of unique parts in the aft mount system 32. The load spreaders 61 and 63 are connected through an upper structural fitting 66, and the load spreaders 62, 64 are connected through a lower structural fitting 68. The core of the engine 24, specifically at the exit guide vane assembly 102, is supported through the connecting struts 70, 72, which connect at the upper and lower structural fittings 66, 68 respectively, and which have an adjustable length such as through inclusion of a telescoping threaded joint. The upper ends 104, 106 of the load spreaders 61, 63 respectively, are spaced apart from one another with the upper structural fitting 66 spanning the gap and connected with each through fasteners. Similarly, the lower ends 110, 112 of the load spreaders 62, 64 respectively, are spaced apart from one another with the lower structural fitting 68 spanning the gap and connected with each through fasteners. The lower end 116 of the load spreader 61 overlaps with the upper end 118 of the load spreader 62 and the two are connected together by a fastener. Similarly, the lower end 120 of the load spreader 63 overlaps with the upper end 122 of the load spreader 64 and the two are connected together by a fastener. Accordingly, a complete load path is provided to surround the engine 24 through a structural ring comprised of the load spreaders 61-64 and the upper and lower structural fittings 66, 68. The load spreaders 61, 62 and the splice plate 60 work together to provide a load path between the engine 24 and the airframe 28 and to dampen vibrations and motion by allowing deflection, the characteristics of which are tunable by tailoring the slits 94.

At the sides of the engine 24, the ends 116, 118 of the load spreaders 61, 62 are spanned by the splice plate 60, and the ends 120, 122 of the load spreaders 63, 64 are spanned by a splice plate 126. The splice plates 60, 126 each include an upper arm 128, 130 respectively, that extends upward to a terminal end and that is arcuate to match the curve of the load spreaders 61, 63. Similarly, the splice plates 60, 126 each include a lower arm 132, 134 respectively, that extends downward to a terminal end and that is arcuate to match the curve of the load spreaders 62, 64. The load spreaders 61-64 include tabs 141-144, respectively, that extend radially outward. The splice plates 60, 126 are connected with the load spreaders 61-64 at the tabs 141-144, through a series of fasteners 146, 148 that are spaced outward relative to the fasteners 150 that attach the load spreaders 61-64 to the outer bypass duct 40.

Figure 6:
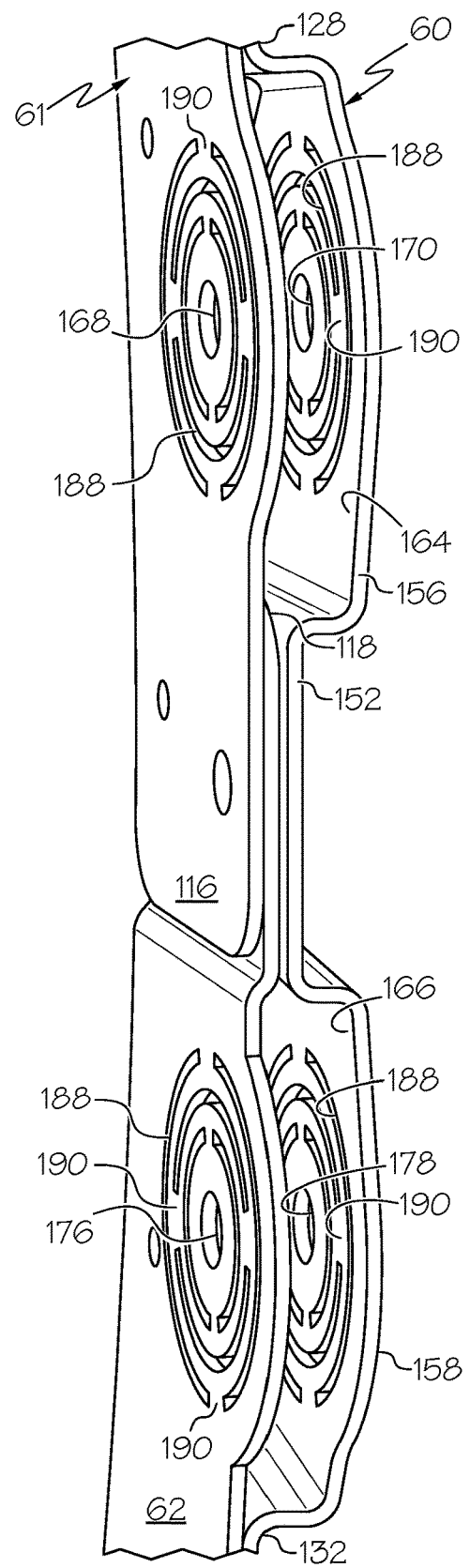
FIG. 6 is a fragmentary view of a part of the engine of FIG. 2 showing part of the mount system.
Figure 7:
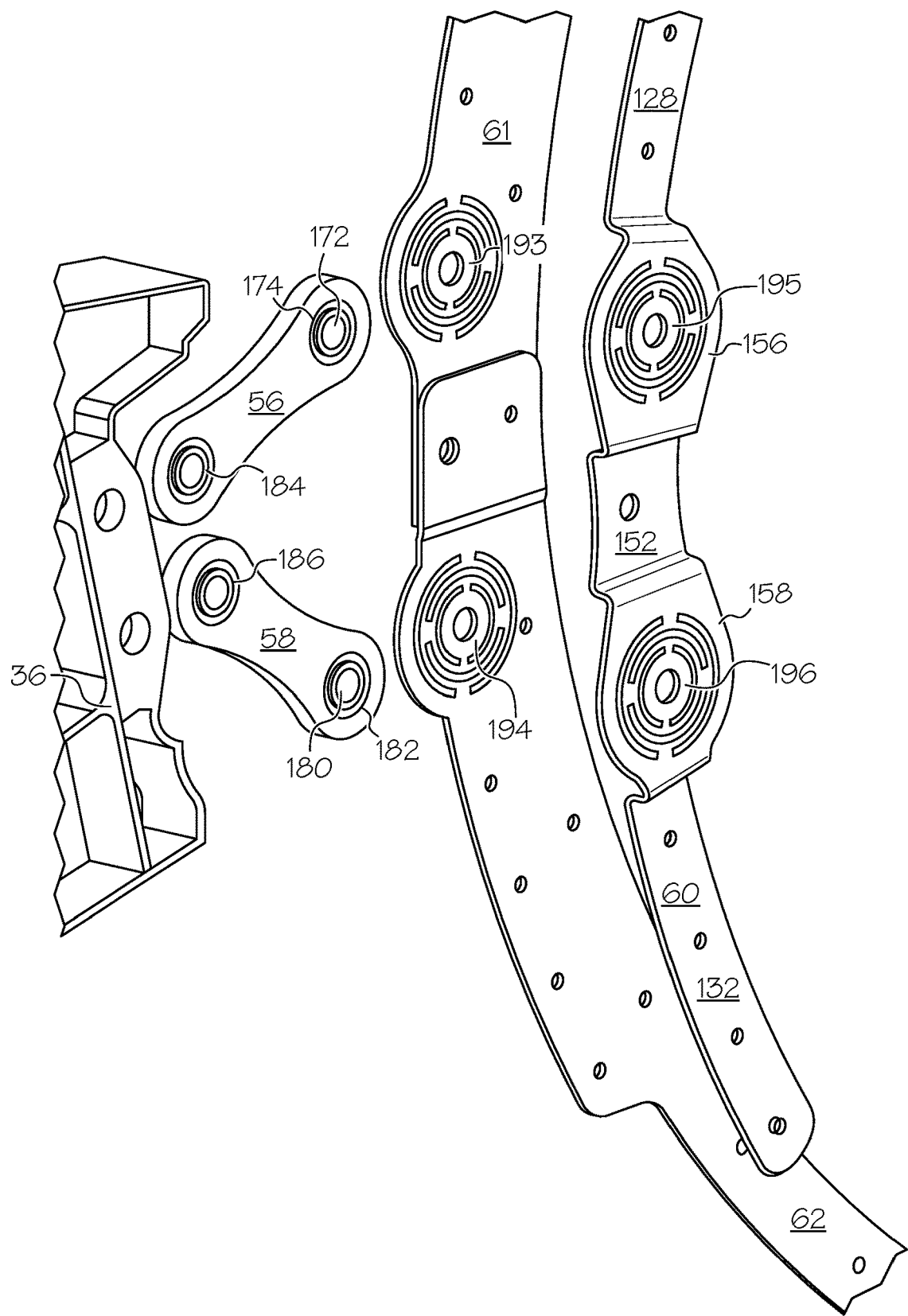
FIG. 7 is a fragmentary exploded view of a part of the engine of FIG. 2, showing part of the mount system.

The splice plates 60, 126 are formed as a continuous structure and each includes a center plate section 152, 154, respectively. The center plate section 152 connects a mounting plate section 156 with another mounting plate section 158. The arms 128, 132 extend from mounting plate sections 156, 158 respectively. Similarly, the center plate section 154 connects a mounting plate section 160 with another mounting plate section 162. The arms 130, 134 extend from mounting plate sections 160, 162 respectively. With additional reference to FIGS. 6 and 7, the splice plate 60 and the load spreaders 61, 62 form a pair of receptacles 164, 166 for receiving the connecting links 56, 58. The center plate section 152 fits against the overlapping ends 116, 118 of the load spreaders 61, 62 and is secured thereto through one or more fasteners (not shown). The mounting plate sections 156, 158 are each offset from the center plate section 152 to be spaced apart from the loader spreaders 61, 62 respectively, forming the receptacles 164, 166. The load spreader 61 forms an opening in the form of a hole 168 that is aligned with an opening in the form of a hole 170 formed in the mounting plate section 156. The pin 71 (shown in FIGS. 2 and 8), extends through the holes 168, 170 and through an opening 172 formed in a spherical bushing 174 carried by the connecting link 56. Similarly, the load spreader 62 forms an opening in the form of a hole 176 that is aligned with an opening in the form of a hole 178 formed in the mounting plate section 158. The pin 73 (shown in FIGS. 2 and 8), extends through the holes 176, 178 and through an opening 180 formed in a spherical bushing 182 carried by the connecting link 58. The connecting links 56, 58 also include bushings 184, 186 for connecting with the pylon beam 36 through pins 75, 77 as shown in FIGS. 2 and 8.

The pylon beam 36, the connecting links 56, 58, the load spreaders 61, 63, the splice plate 60, and the pins 71, 73, 75, 77 provide a continuous connecting path between the airframe 28 and the engine 24. To dampen vibration between the engine 24 and the airframe 28, the connection includes a number of slits 188 surrounding each of the holes 168, 170, 176, 178. The slits 188 are formed as narrow elongated openings that provide deflectability so that the holes 168, 170, 176, 178 act as damping holes. In the current embodiment, the slits 188 are formed in the load spreaders 61, 63 and in the mounting plates 156, 158 of the splice plate 60. In other embodiments, the slits 188 may be formed in the connecting links 56, 58 in addition to, or in place of, those in the load spreaders 61, 63 and the splice plate 60. In still other embodiments, the slits 188 may be formed at other locations of the pylon beam 36 and/or of the engine 24. The slits 188 are formed around the holes 168, 170, 176, 178 and provide a measure of deflection under load between the engine 24 and the pylon beam 36 to dampen the transmission of vibrations. In operation, the slits 188 allow the location of the holes 168, 170, 176, 178 to move relative to their nominal location in providing the damping effect. Hence the holes 168, 170, 176, 178 provide the effect of damping holes providing a hybrid hard-soft mount that has a continuous connection and damping properties. In the current embodiment, the slits 188 include a series of concentric ring-like openings that partially encircle the holes 168, 170, 176, 178, and that extend completely through the thickness of the load spreaders 61, 63 and the splice plate 60. In other embodiments, the slits 188 may be formed in other shapes and/or may not extend completely through the thickness. Connections in the form of ligaments 190 extend radially across each of the slits 188 so that support is provided for the rings 193-196 that surround the holes 168, 170, 176, 178. The ligaments 190 are staggered relative to one another as they pass through each of the concentric slits 188 so that they are not all radially aligned, and may be evenly spaced to provide consistent damping in all radial directions. In other embodiments, certain of the ligaments 190 may be wider than others, or ligaments 190 may be aligned or concentrated in certain radial directions to provide more support when needed to address directions of loading.

Figure 8:
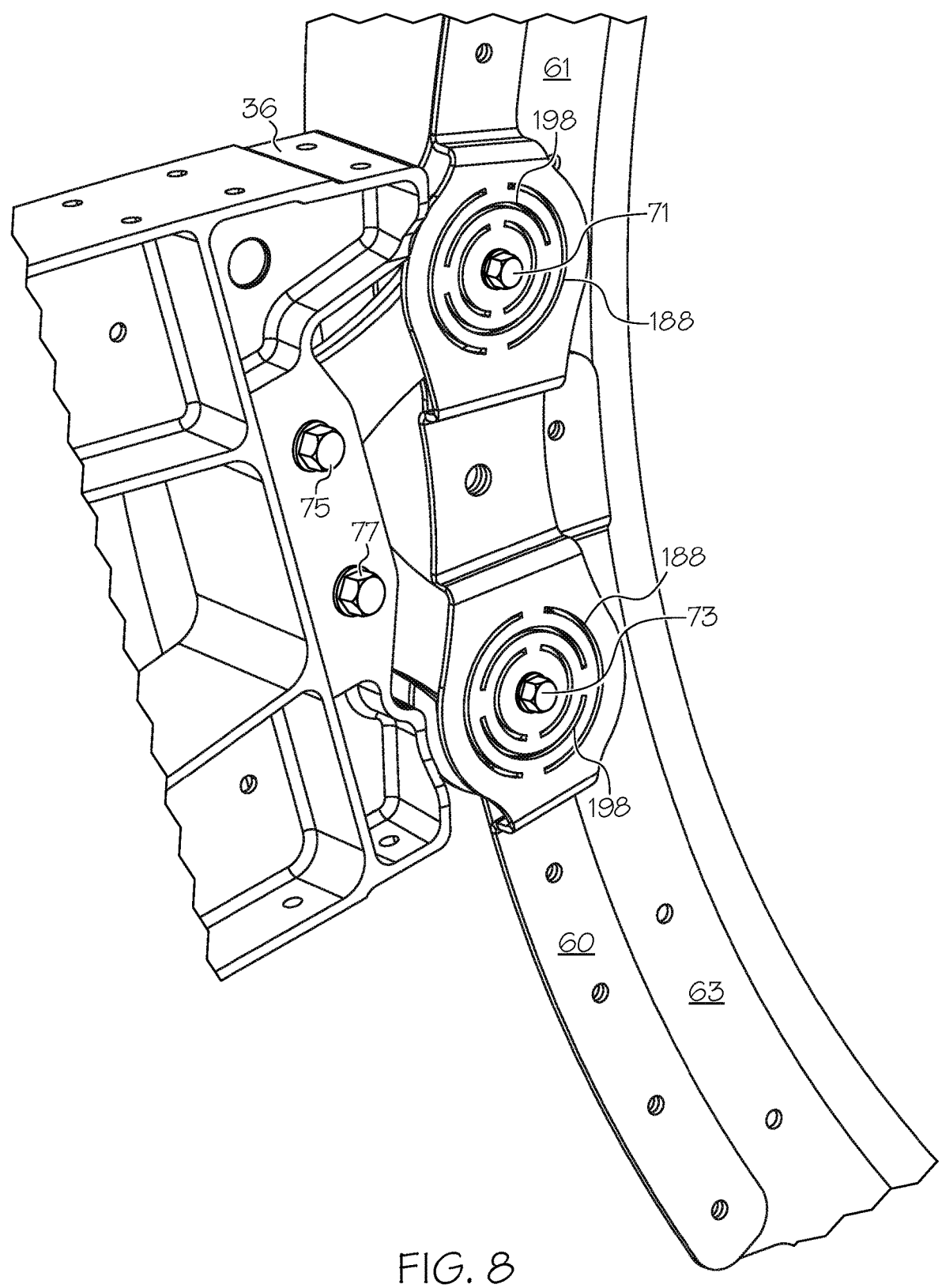
FIG. 8 is a fragmentary view of a part of the engine of FIG. 2, showing part of the mount system according to an additional exemplary embodiment.

Referring to FIG. 8, an embodiment has the slits 188 filled with a resilient material 198, in this example an elastomer. Addition of the resilient material 198 tailors the damping effect of the mount to address certain vibrations. In the event the resilient material 198 is degraded or depleted, such as through an elevated heat event, the engine 24 remains supported on the airframe 28 through the continuous metal path provided by the pylon beam 36, the connecting links 56, 58, the load spreaders 61, 63, the splice plate 60, and the pins 71, 73, 75, 77.

The embodiments described in relation to FIGS. 2-8 are tunable to address vibrations at different frequencies and to provide varying degrees of stiffness in different directions of loading. Tuning is a function of the materials used for the components, the material thickness, spacing, size, depth and length of the slits 94, 188, the size and location of the ligaments 98, 190, the presence of a resilient material 198 and its durometer rating. For example, to bear higher loads in a given direction, the ligaments 98, 190 may be larger. Also for example, to provide greater damping, the width and/or the number of the slits 94, 188 may be increased.

Figure 9:
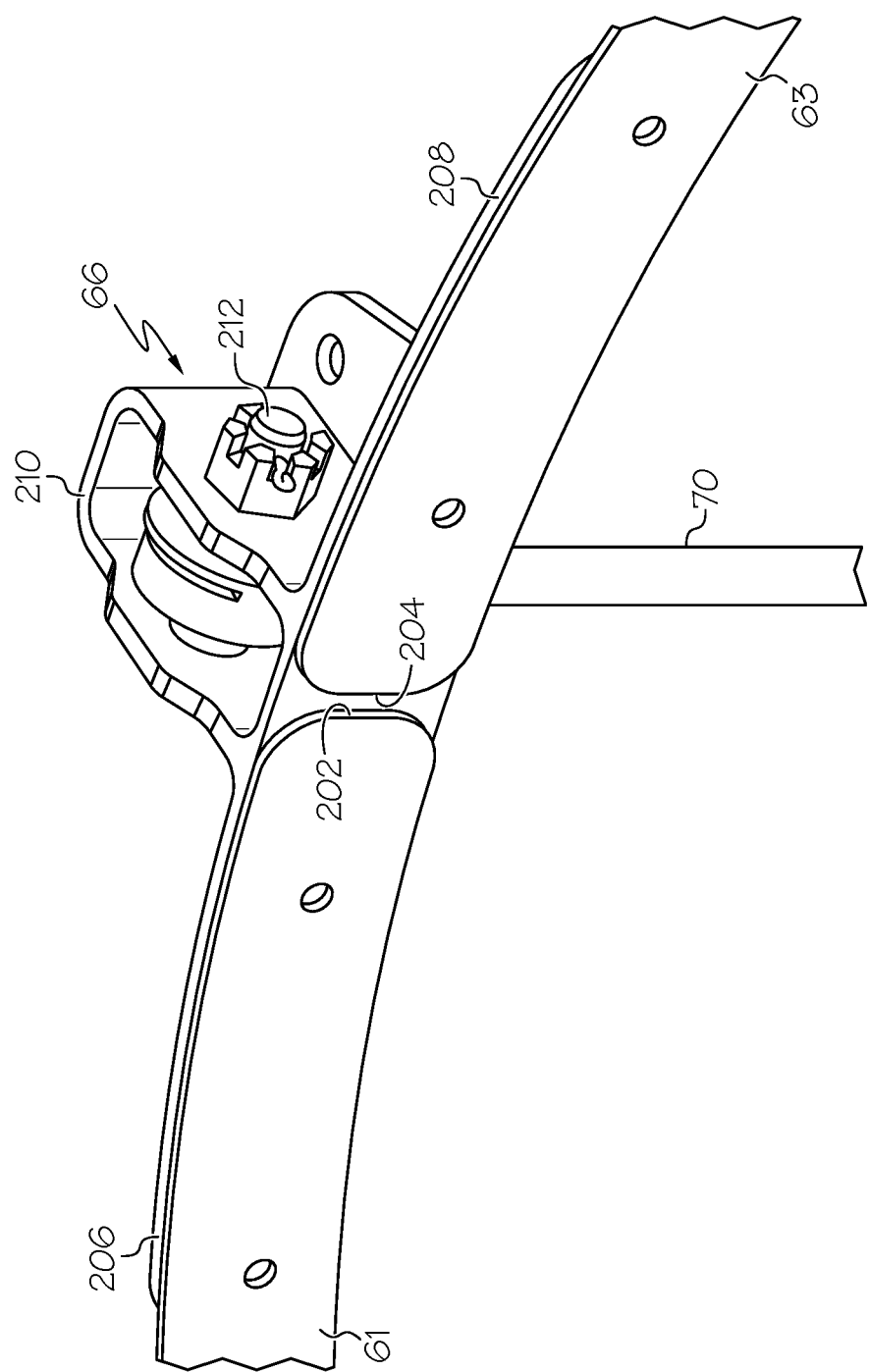
FIG. 9 is a fragmentary view of a part of the engine of FIG. 2, showing an upper structural fitting part of the mount system.

Referring to FIG. 9, the upper structural fitting 66 is illustrated connecting the load spreaders 61, 63 with the connecting strut 70. The upper end 202 of the load spreader 61 is spaced apart from the upper end 204 of the load spreader 63. The upper structural fitting 66 includes an arm 206 that is connected with the load spreader 61 through fasteners (not shown), and an arm 208 that is connected with the load spreader 63 through fasteners (not shown). The upper structural fitting 66 includes a block 210 within which the connecting strut 70 and spherical bearing are received and to which it is attached by a bolt 212. The block 210 may be connected with the outer ducting of the engine 24.

Figure 10:
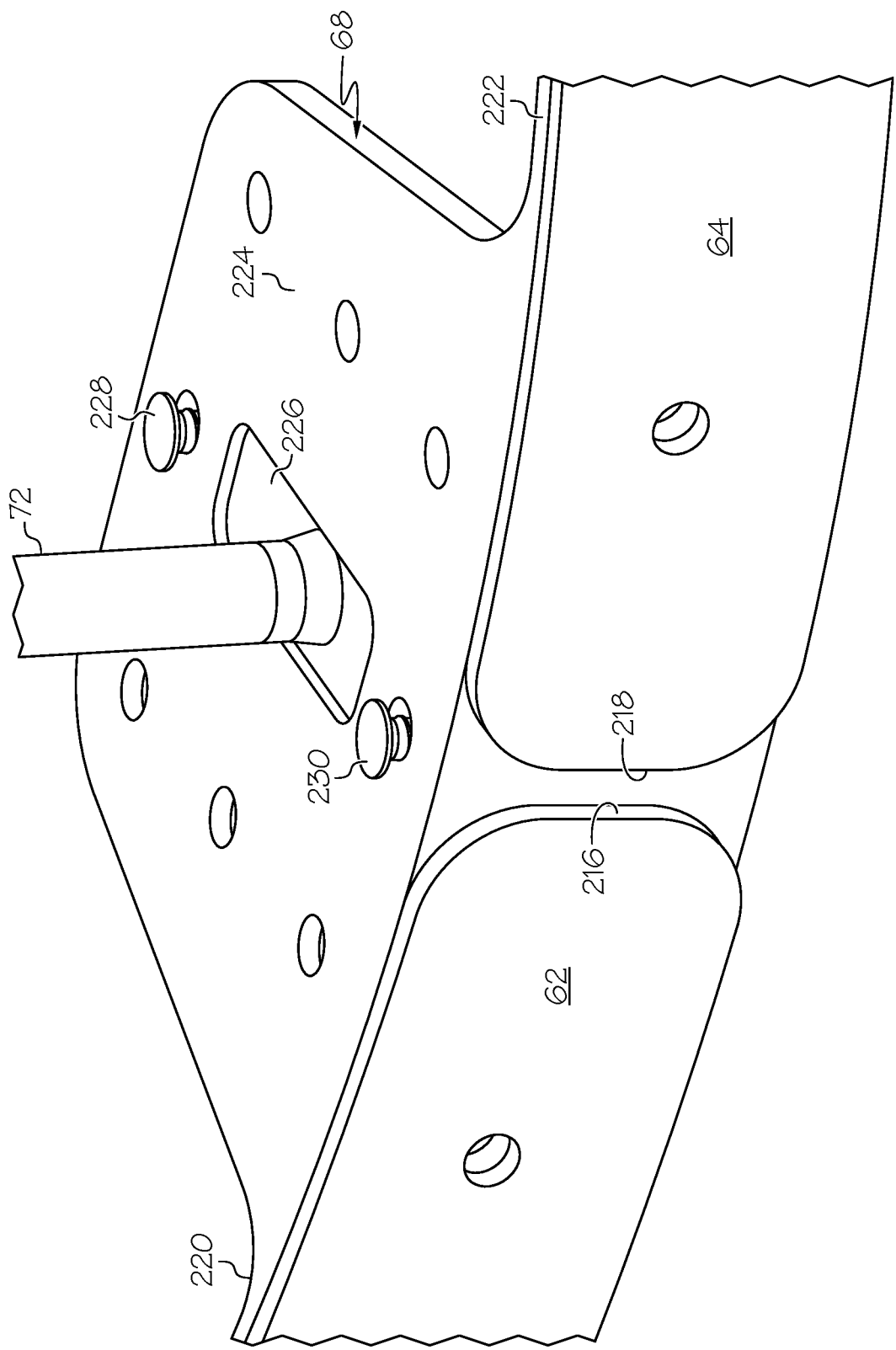
FIG. 10 is a fragmentary view of a part of the engine of FIG. 2, showing a lower structural fitting part of the mount system.
Figure 11:
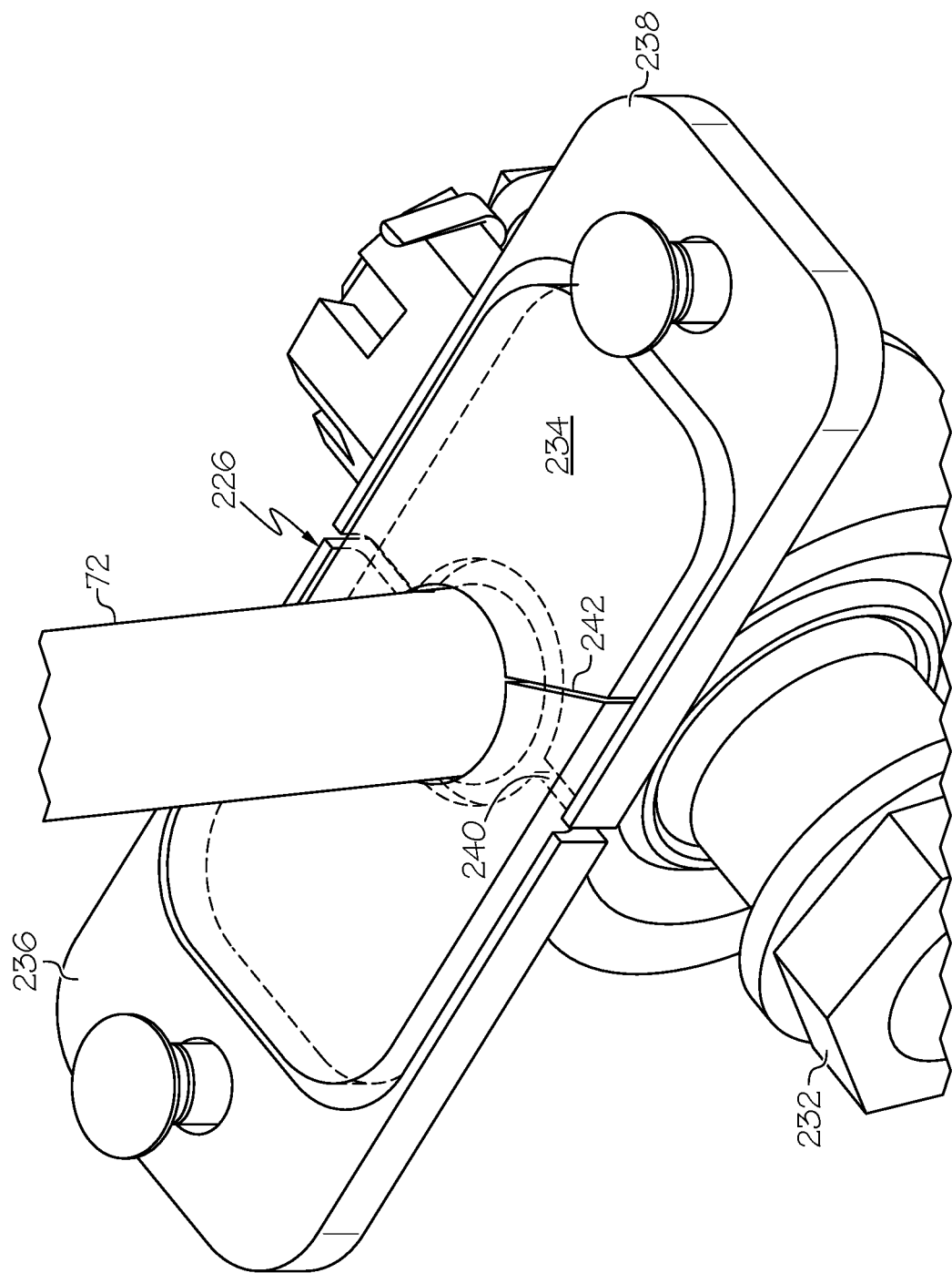
FIG. 11 is a fragmentary perspective illustration of a part of the engine of FIG. 2 showing a seal area of a lower structural fitting part of the mount system.

As shown in FIG. 10 the lower structural fitting 68 is illustrated connecting the load spreaders 62, 64 with the connecting strut 72. The lower end 216 of the load spreader 62 is spaced apart from the lower end 218 of the load spreader 64. The lower structural fitting 68 includes an arm 220 that is connected with the load spreader 62 through fasteners (not shown), and an arm 222 that is connected with the load spreader 64 through fasteners (not shown). The lower structural fitting 68 includes a block 224 within which the connecting strut 72 is received and to which it is attached by a bolt 232 (shown in FIG. 11), similar to the upper structural fitting 66. The block 224 may be connected with the outer ducting of the engine 24. A seal assembly 226 surrounds the connecting strut 72 where it passes through the block 224 to enclose the area for pressurization during operation of the engine 24. The seal assembly 226 is held in place by fasteners 228, 230. As shown in FIG. 11, the seal assembly 226 includes a split seal 234 that nests in seal retainers 236, 238. The seal retainers 236, 238 are fastened to the block 224 holding the two parts of the split seal 234 in place. The split lines 240, 242 of the split seal 234 and the seal retainers 236, 238 respectively, are offset from one another to enhance sealing.

Through the embodiments described herein, a mount system provides vibration damping while maintaining a metal support structure throughout the entire load path from the engines 22, 24 to the airframe 28, without requiring a waiting failsafe link. The system which supports the engine core allows a thrust reverser to be removed without removing the engine 22, 24 from the airframe 28. Engine 22, 24 to airframe 28 damping is tunable and is easily modified late in the development cycle by varying the slits 94, 190. The mount system has minimal weight addition and may use a titanium structural ring assembly to carry the aft mount loads between the engine 22, 24 and the airframe 28.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A mount system comprising:
a first body;
a second body connected with the first body;
a first coupling element on the first body, with a first opening defined by the first coupling element;
a second coupling element on the second body, with a second opening defined by the second coupling element; and
a pin extending through the first and second openings to couple the first body to the second body;
wherein at least one of the first opening of the first coupling element or the second opening of the second coupling element comprises a damping hole with a series of slits disposed about the damping hole, so that the damping hole with the slits is configured to provide a reduction in transmission of vibrations between the first body and the second body;
wherein the slits comprise openings that extend completely through at least one of the first coupling element and the second coupling element;
wherein at least one of the slits is filled with an elastomer configured to tune the reduction in transmission of vibrations,
wherein the elastomer is exposed and subject to a depletion in an elevated heat event;
wherein, in event of the depletion of the elastomer, the first coupling element and the second coupling element are configured to;
continue to couple together the first body and the second body; and
continue to provide damping between the first body and the second body.

2. The mount system of claim 1, wherein the slits are configured as concentric ring-like elements.

3. The mount system of claim 2, wherein each ring-like element is discontinuous around the damping hole, with ligaments extending radially to separate arc segments of each ring-like element from each other.

4. The mount system of claim 3, wherein the slits are configured to allow at least one of the first opening and the second opening to deflect in response to vibrations.

5. The mount system of claim 1, wherein the slits are formed by the first coupling element.

6. The mount system of claim 1, wherein the first coupling element comprises a clevis bracket with a pair of spaced apart mounting plates, wherein the first opening and the slits are formed in at least one of the mounting plates.

7. The mount system according to claim 6, wherein the second coupling element comprises a yoke wherein the second opening is formed in the yoke.

8. The mount system of claim 1, wherein the first coupling element comprises a pair of load spreaders configured to distribute loads, and a splice plate connected with the load spreaders, wherein the first opening and the slits are formed in the splice plate.

9. The mount system of claim 8, comprising a connecting link coupled between the second body and the splice plate.

10. The mount system of claim 8, wherein the first body comprises a turbine engine having an outer bypass duct and a core, wherein the load spreaders are connected to the engine at the outer bypass duct.

11. The mount system of claim 10, comprising a structural fitting connected with at least one of the load spreaders and a connecting strut extending between the structural fitting and the core, the connecting strut configured to support the core.

12. The mount system of claim 11, wherein the second body comprises an airframe of an aircraft with a pylon beam connecting the airframe with the first body.

13. A mount system comprising:
a body;
a frame connected with the body;
a yoke connected with the frame and including a first tang defining a first opening and a second tang defining a second opening aligned with the first opening, the yoke including a third tang defining a third opening and a fourth tang defining a fourth opening aligned with the third opening;
a first clevis bracket that includes spaced apart first and second mounting plates joined with a first base plate, the first mounting plate defining a fifth opening and the second mounting plate defining a sixth opening;
a second clevis bracket that includes spaced apart third and fourth mounting plates joined with a second base plate, the third mounting plate defining a seventh opening and the fourth mounting plate defining an eighth opening, wherein the first and second base plates are coupled with the body;
a first pin extending through the first opening, the second opening, the fifth opening and the sixth opening to couple the body to the frame;
a second pin extending through the third opening, the fourth opening, the seventh opening, and the eighth opening to couple the body to the frame, wherein the first and second pins are placed in a double shear condition;
wherein at least one of the first opening, the second opening, the fifth opening and the sixth opening comprises a first damping hole,
wherein, at least one of the third opening, the fourth opening, the seventh opening and the eighth opening comprises a second damping hole,
wherein the first and second damping holes each comprise a series of slits disposed concentrically about the respective damping hole, wherein the respective damping hole, with the series of disposed slits, is configured to reduce transmission of vibrations between the body and the frame.

14. The mount system of claim 13, wherein the slits are configured as concentric ring-like elements, wherein each ring-like element is discontinuous around the damping hole, with ligaments extending radially to separate arc segments of the ring-like element from each other.

15. The mount system of claim 13, wherein the slits contain an elastomer.

16. The mount system of claim 13, wherein the frame comprises an airframe of an aircraft and the body comprises an engine, the mount system comprising:
a structural ring surrounding the engine and comprising first and second upper load spreaders, and first and second lower load spreaders, wherein the first upper load spreader, the first lower load spreader, the second upper load spreader and the second lower load spreader are connected together in the structural ring, wherein the first and second upper load spreaders are identical and the first and second lower load spreaders are identical, wherein the first upper load spreader defines a first hole and the first lower load spreader defines a second hole;

a splice plate spanning the first upper load spreader and the second upper load spreader, the splice plate defining a third hole aligned with the first hole and defining a fourth hole aligned with the second hole;

a first connecting link coupled with the frame and defining a first connecting link opening;

a second connecting link coupled with the frame and defining a second connecting link opening;

a third pin extending through the first hole, the first connecting link opening and the third hole, connecting the engine to the frame;

a fourth pin extending through the second hole, the second connecting link opening and the fourth hole, connecting the engine to the frame;

wherein at least one of the first hole and the third hole comprises a third damping hole with a second series of slits disposed concentrically about the respective damping hole;

wherein at least one of the second hole and the fourth hole comprises a fourth damping hole with a third series of slits disposed concentrically about the respective damping hole.

17. The mount system of claim 16, wherein the first and second upper load spreaders are spaced apart to define a first gap and the first and second lower load spreaders are spaced apart to define a second gap, and comprising:

a first structural fitting spanning the first gap and connected with the first and second upper load spreaders; and a second structural fitting spanning the second gap and connected with the first and second lower load spreaders.

18. The mount system of claim 17 comprising:

a first connecting strut attached to the first structural fitting;

a second connecting strut attached to the second structural fitting; and a core of the engine supported by the first and second connecting struts.

19. The mount system of claim 13, wherein the slits are formed in at least one of the mounting plates.

20. A mount system comprising:

a frame;

an engine connected with the frame;

a structural ring surrounding the engine and comprising first and second upper load spreaders, and first and second lower load spreaders, wherein the first upper load spreader, the first lower load spreader, the second upper load spreader and the second lower load spreader are connected together in the structural ring, wherein the first and second upper load spreaders are identical and the first and second lower load spreaders are identical, wherein the first upper load spreader defines a first hole and the first lower load spreader defines a second hole;

a splice plate spanning the first upper load spreader and the second upper load spreader, the splice plate defining a third hole aligned with the first hole and defining a fourth hole aligned with the second hole;

a first connecting link coupled with the frame and defining a first connecting link opening;

a second connecting link coupled with the frame and defining a second connecting link opening;

a first pin extending through the first hole, the first connecting link opening and the third hole connecting the engine to the frame;

a second pin extending through the second hole, the second connecting link opening and the fourth hole, connecting the engine to the frame;

wherein at least one of the first hole and the third hole comprises a first damping hole with a first series of slits disposed concentrically about the respective damping hole to dampen vibrations;

wherein at least one of the second hole and the fourth hole comprises a second damping hole with a second series of slits disposed concentrically about the respective damping hole to dampen vibrations.

* * * * *